(12) United States Patent
Kubota et al.

(10) Patent No.: US 11,301,805 B2
(45) Date of Patent: Apr. 12, 2022

(54) RECOMMENDED ORDER QUANTITY DETERMINING DEVICE, RECOMMENDED ORDER QUANTITY DETERMINATION METHOD, AND RECOMMENDED ORDER QUANTITY DETERMINATION PROGRAM

(71) Applicant: NEC CORPORATION, Tokyo (JP)

(72) Inventors: Yuuki Kubota, Tokyo (JP); Takayuki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 16/650,893

(22) PCT Filed: Jul. 3, 2018

(86) PCT No.: PCT/JP2018/025244
§ 371 (c)(1),
(2) Date: Mar. 26, 2020

(87) PCT Pub. No.: WO2019/064789
PCT Pub. Date: Apr. 4, 2019

(65) Prior Publication Data
US 2020/0286029 A1    Sep. 10, 2020

(30) Foreign Application Priority Data

Sep. 26, 2017  (JP) .............................. JP2017-184611

(51) Int. Cl.
*G06Q 10/08*    (2012.01)
*G06F 7/499*    (2006.01)
*G06Q 40/06*    (2012.01)

(52) U.S. Cl.
CPC ....... *G06Q 10/087* (2013.01); *G06F 7/49963* (2013.01); *G06Q 10/083* (2013.01)

(58) Field of Classification Search
CPC .... G06Q 10/087; G06Q 10/083; G06Q 10/08; G06F 7/49963
(Continued)

(56) References Cited

U.S. PATENT DOCUMENTS 7,418,404 B2 *  8/2008  Mori .................. G06Q 30/0633
                                                705/26.8
10,909,624 B2 *  2/2021  Shirazi .................. G06Q 40/06
(Continued)

FOREIGN PATENT DOCUMENTS

JP    H09-251498 A    9/1997
JP    2000-163484 A    6/2000
(Continued)

OTHER PUBLICATIONS

Hidetoshi Miura, "Operations Research, non-official translation (About shelf partition of shops that Yeduce product replenishment works)", Sep. 1, 2013, pp. 540-544, vol. 58, No. 9.
(Continued)

*Primary Examiner* — Garcia Ade
(74) *Attorney, Agent, or Firm* — Sughrue Mion, PLLC

(57) ABSTRACT

A recommended order quantity determining device 80 includes a recommended order quantity determination unit 81. The recommended order quantity determination unit 81 determines a recommended order quantity of each commodity from a required quantity of the commodity expressed by a decimal, depending on an order unit of the commodity. The recommended order quantity determination unit 81 determines the recommended order quantity of each commodity, depending on a total required quantity of a commodity category including the commodity.

16 Claims, 7 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2011/0246215 A1* | 10/2011 | Postma | G06Q 10/087 |
| | | | 705/2 |
| 2012/0316919 A1* | 12/2012 | Vardar | G06Q 30/0283 |
| | | | 705/7.31 |
| 2014/0279204 A1* | 9/2014 | Roketenetz | G06Q 30/0631 |
| | | | 705/26.7 |
| 2016/0350832 A1* | 12/2016 | Franklin | G06Q 30/0633 |
| 2018/0033076 A1* | 2/2018 | Roundtree | G06K 7/1413 |

FOREIGN PATENT DOCUMENTS

| | | |
|---|---|---|
| JP | 2009-187151 A | 8/2009 |
| JP | 2015-108928 A | 6/2015 |
| JP | 2015-108976 A | 6/2015 |

OTHER PUBLICATIONS

International Search Report of PCT/JP2018/025244 dated Sep. 18, 2018 [PCT/ISA/210].
Japanese Office Action for JP Application No. 2019-544292 dated Feb. 9, 2021 with English Translation.

* cited by examiner

FIG. 1
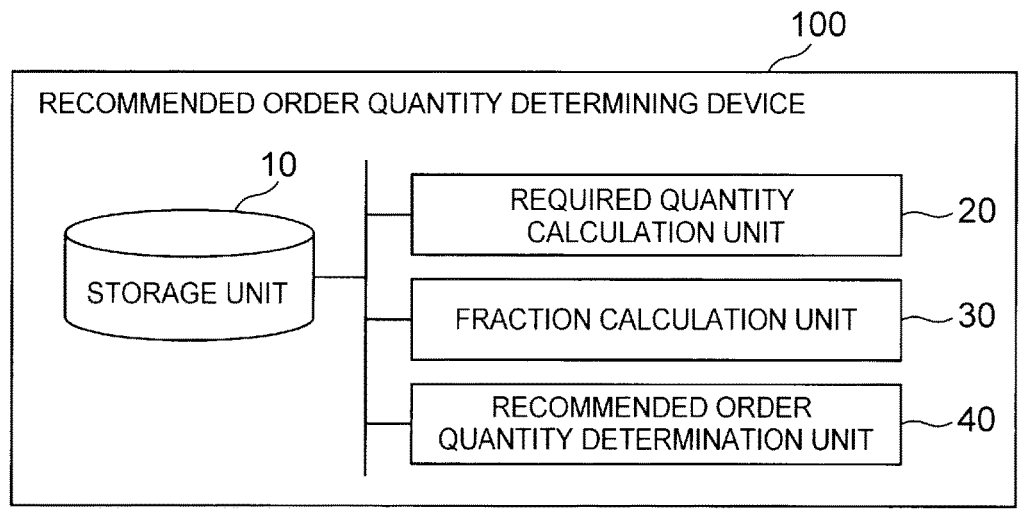
FIG. 2
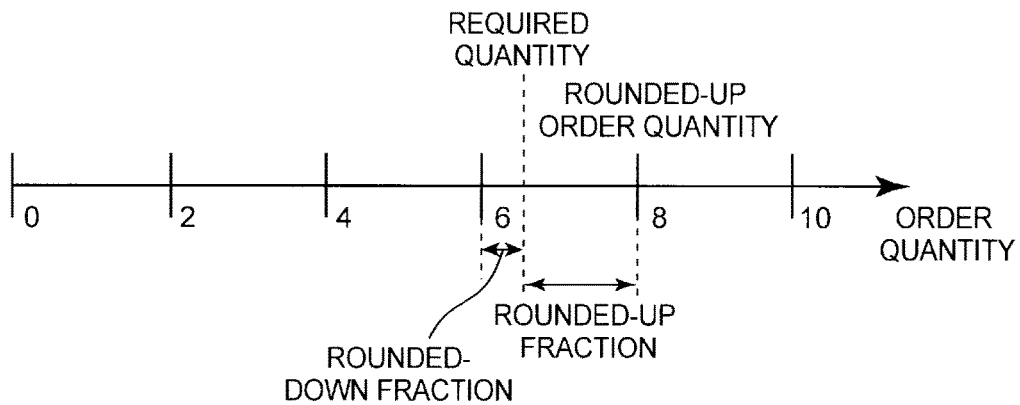
FIG. 3
| COMMODITY NAME | MINIMUM ORDER QUANTITY | ORDER UNIT | REQUIRED QUANTITY | ROUNDED-UP ORDER QUANTITY | ROUNDED-DOWN ORDER QUANTITY | ROUNDED-UP FRACTION |
|---|---|---|---|---|---|---|
| COMMODITY A | 2 | 2 | 16.6 | 18 | 16 | 1.4 |
| COMMODITY B | 2 | 2 | 15.7 | 16 | 14 | 0.3 |
| COMMODITY C | 2 | 1 | 10.4 | 11 | 10 | 0.6 |
| COMMODITY D | 2 | 2 | 7.3 | 8 | 6 | 0.7 |
| COMMODITY E | 3 | 1 | 2.6 | 3 | 0 | 0.4 |
| COMMODITY F | 3 | 1 | 1.3 | 3 | 0 | 1.7 |
| CATEGORY SUM TOTAL | | | 53.9 | 59 | 46 | |

FIG. 4

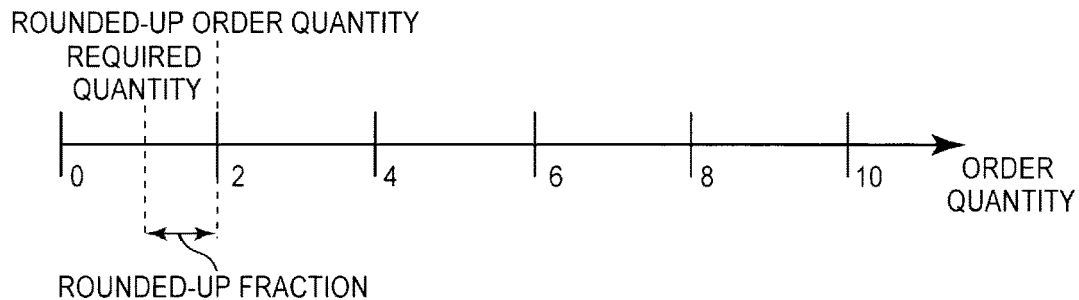

FIG. 5

| COMMODITY NAME | MINIMUM ORDER QUANTITY | ORDER UNIT | REQUIRED QUANTITY | ROUNDED-UP ORDER QUANTITY | ROUNDED-DOWN ORDER QUANTITY | ROUNDED-UP FRACTION | RECOMMENDED ORDER QUANTITY | PROCESSING RESULT |
|---|---|---|---|---|---|---|---|---|
| COMMODITY A | 2 | 2 | 16.6 | 18 | 16 | 1.4 | 16 | ROUNDING DOWN |
| COMMODITY B | 2 | 2 | 15.7 | 16 | 14 | 0.3 | 16 | ROUNDING UP |
| COMMODITY C | 2 | 1 | 10.4 | 11 | 10 | 0.6 | 11 | ROUNDING UP |
| COMMODITY D | 2 | 2 | 7.3 | 8 | 6 | 0.7 | 8 | ROUNDING UP |
| COMMODITY E | 3 | 1 | 2.6 | 3 | 0 | 0.4 | 3 | ROUNDING UP |
| COMMODITY F | 3 | 1 | 1.3 | 3 | 0 | 1.7 | 3 | CORRECTION TO MINIMUM ORDER QUANTITY |
| CATEGORY SUM TOTAL | | | 53.9 | 59 | 46 | | 57 | |

FIG. 6

| COMMODITY NAME | MINIMUM ORDER QUANTITY | ORDER UNIT | REQUIRED QUANTITY | ROUNDED-UP ORDER QUANTITY | ROUNDED-DOWN ORDER QUANTITY | ROUNDED-UP FRACTION | RECOMMENDED ORDER QUANTITY | PROCESSING RESULT |
|---|---|---|---|---|---|---|---|---|
| COMMODITY A | 2 | 2 | 16.6 | 18 | 16 | 1.4 | 16 | ROUNDING DOWN |
| COMMODITY B | 2 | 2 | 15.7 | 16 | 14 | 0.3 | 16 | ROUNDING UP |
| COMMODITY C | 2 | 1 | 10.4 | 11 | 10 | 0.6 | 10 | ROUNDING DOWN |
| COMMODITY D | 2 | 2 | 7.3 | 8 | 6 | 0.7 | 6 | ROUNDING DOWN |
| COMMODITY E | 3 | 1 | 2.6 | 3 | 0 | 0.4 | 3 | ROUNDING UP |
| COMMODITY F | 3 | 1 | 1.3 | 3 | 0 | 1.7 | 3 | ROUNDING UP |
| CATEGORY SUM TOTAL | | | 53.9 | 59 | 46 | | 54 | |

FIG. 9
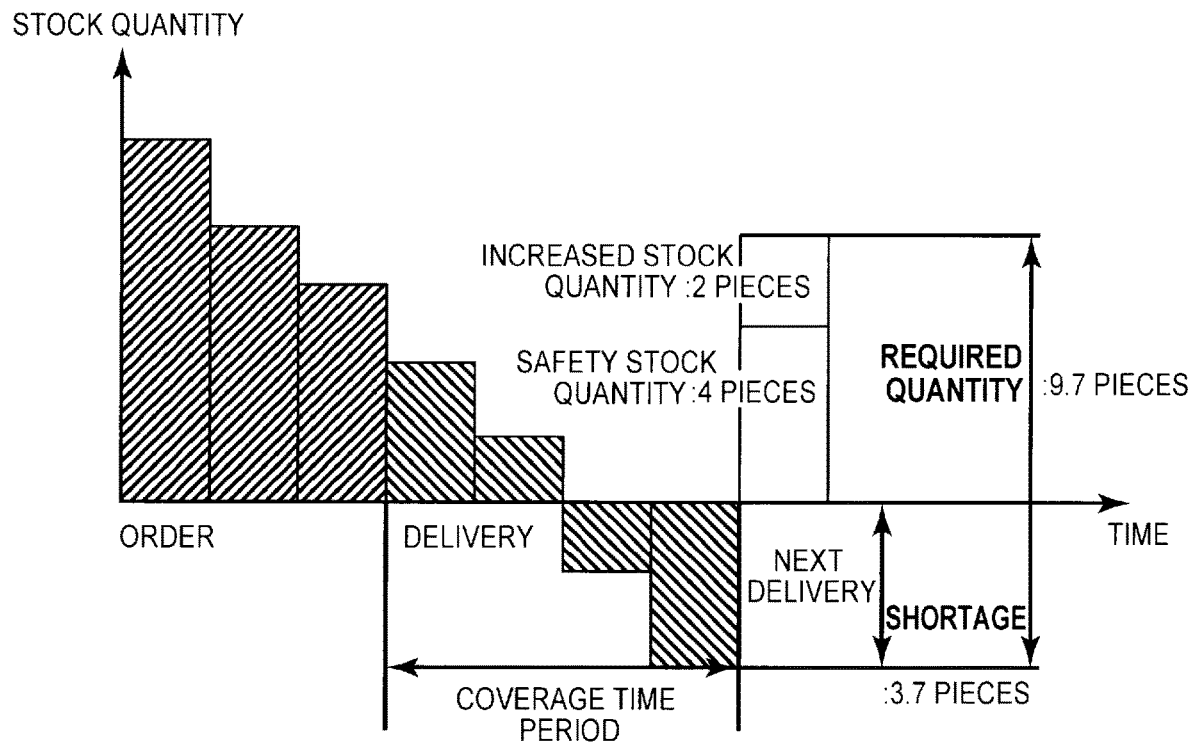
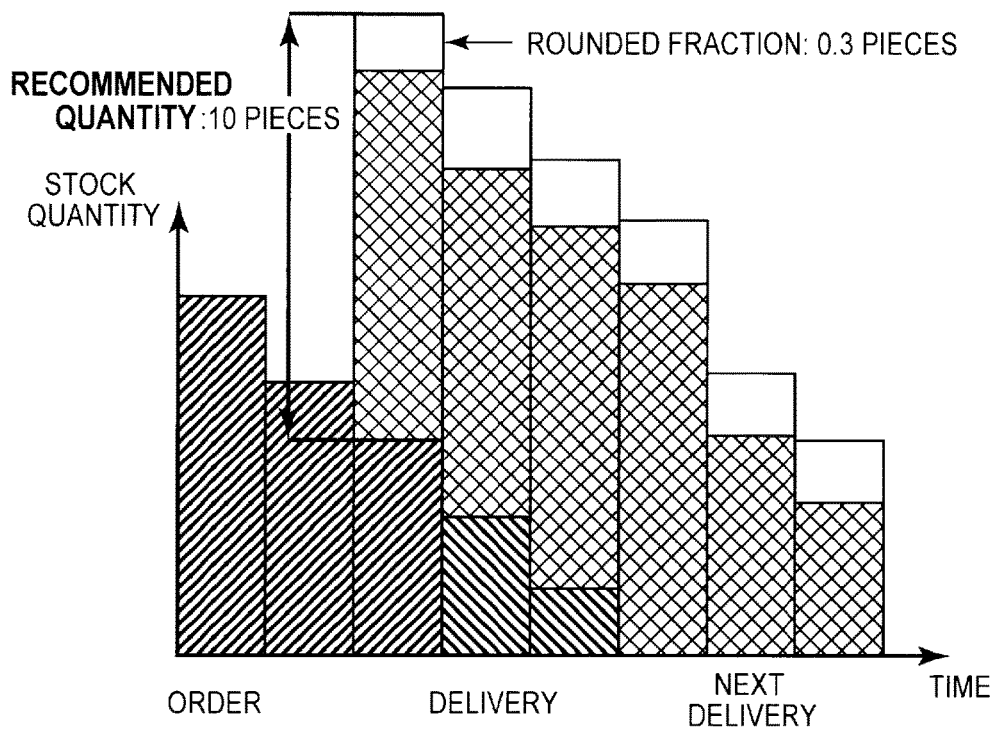

FIG. 11
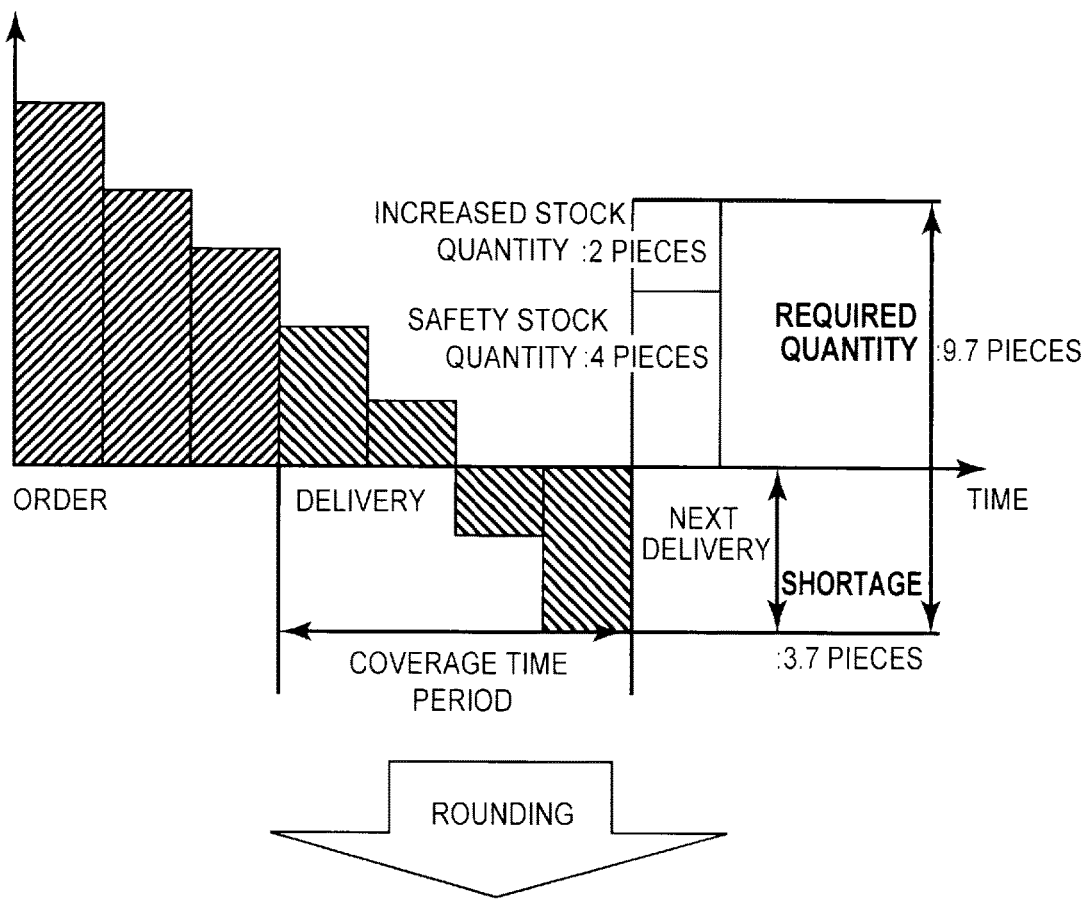
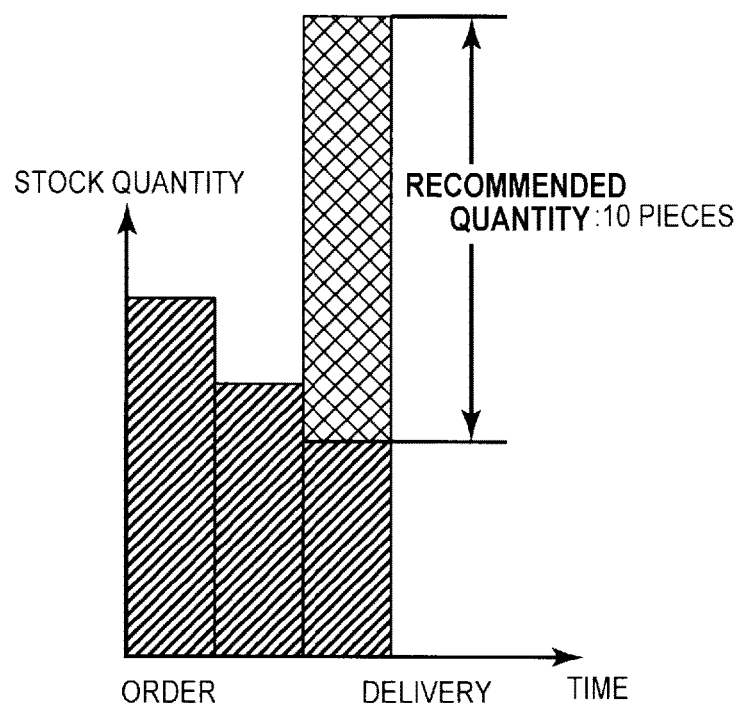

RECOMMENDED ORDER QUANTITY DETERMINING DEVICE, RECOMMENDED ORDER QUANTITY DETERMINATION METHOD, AND RECOMMENDED ORDER QUANTITY DETERMINATION PROGRAM

CROSS REFERENCE TO RELATED APPLICATIONS

This application is a National Stage of International Application No. PCT/JP2018/025244, filed Jul. 3, 2018, claiming priority to Japanese Patent Application No. 2017-184611, filed Sep. 26, 2017, the contents of all of which are incorporated herein by reference in their entirety.

TECHNICAL FIELD

The present invention relates to a recommended order quantity determining device, a recommended order quantity determination method, and a recommended order quantity determination program for determining the recommended order quantity of a commodity.

BACKGROUND ART

To reduce unnecessary stock and stockouts, various methods of appropriately recommending the order quantity of each commodity have been proposed. For example, Patent Literature (PTL) 1 describes an inventory management system that, in the case where delivery or ordering of an article is performed on a regular basis, determines the order quantity of the article more accurately. The system described in PTL 1 predicts demand in a prediction target period that is a period from the delivery time in response to an order to the next delivery time.

PTL 2 describes a raw material order management device that calculates the order quantity of each raw material depending on the sales planning of a processed commodity. The raw material order management device described in PTL 2 calculates the raw material-specific total required quantity of each raw material with reference to a raw material-specific data table, based on sales planning data. In the case where the required quantity of each raw material is expressed by a ratio to the order unit and the calculation result is output in the order unit of the raw material, the raw material order management device described in PTL 2 subjects the fractional part (decimal part) of the calculation result of the raw material-specific total required quantity to rounding up.

CITATION LIST

Patent Literatures

PTL 1: Japanese Patent Application Laid-Open No. 2009-187151
PTL 2: Japanese Patent Application Laid-Open No. 2000-163484

SUMMARY OF INVENTION

Technical Problem

In future commodity demand prediction, calculation is not always performed in the order unit. Hence, processing of the fractional part or processing to conform to the order unit is performed, as described in PTL 2.

FIG. 11 is an explanatory diagram depicting an example of a process of determining recommended order quantity. For example, suppose increased stock quantity of 2 pieces and safety stock quantity of 4 pieces are secured, as depicted in FIG. 11. Also suppose, as a result of performing commodity demand prediction, it is predicted that, given a delivery interval (also referred to as "coverage time period"), a commodity stock shortage of 3.7 pieces will occur at the next delivery time if there is no delivery of the commodity at the next delivery time. In such a case, the required quantity at the next delivery time is calculated at increased stock quantity of 2 pieces+safety stock quantity of 4 pieces+shortage of 3.7 pieces=9.7 pieces.

Typically, commodities are ordered in integer numbers. Accordingly, the recommended order quantity is determined to be 10 pieces as a result of rounding up the fractional part as described in PTL 2.

There is a problem in that, in the case where rounding up of the fractional part is performed for the required quantities of all of a plurality of commodities, the total order quantity varies significantly. For example, suppose there are 20 types of commodities (e.g. onigiri (rice ball)) in one category, and the total required quantity of the whole category is calculated at 30 pieces. Also suppose, of the commodities in the category, the required quantity of each of 12 types of commodities is calculated at 1.1 pieces and the required quantity of each of 8 types of commodities is calculated at 2.1 pieces. In the calculation of the required quantity of each individual commodity in the category, if the fractional part of the required quantity of every commodity is rounded up, the required quantity of each of the 12 types of commodities is calculated at 2 pieces, and the required quantity of each of the 8 types of commodities is calculated at 3 pieces. Thus, the total required quantity of the whole category will end up being 48 pieces, which is significantly different from the foregoing total required quantity.

PTL 1 describes the order quantity calculation method in the case where delivery or ordering of an article is performed on a regular basis, but fails to take into consideration the fractional part.

The present invention therefore has an object of providing a recommended order quantity determining device, a recommended order quantity determination method, and a recommended order quantity determination program that can determine recommended order quantity so that the total required quantity of commodities does not vary significantly from total recommended quantity.

Solution to Problem

A recommended order quantity determining device according to the present invention includes a recommended order quantity determination unit which determines a recommended order quantity of each commodity from a required quantity of the commodity expressed by a decimal, depending on an order unit of the commodity, wherein the recommended order quantity determination unit determines the recommended order quantity of each commodity, depending on a total required quantity of a commodity category including the commodity.

A recommended order quantity determination method according to the present invention includes determining a recommended order quantity of each commodity from a required quantity of the commodity expressed by a decimal, depending on an order unit of the commodity and a total required quantity of a commodity category including the commodity.

A recommended order quantity determination program according to the present invention causes a computer to perform a recommended order quantity determination process of determining a recommended order quantity of each commodity from a required quantity of the commodity expressed by a decimal, depending on an order unit of the commodity, wherein in the recommended order quantity determination process, the computer is caused to determine the recommended order quantity of each commodity, depending on a total required quantity of a commodity category including the commodity.

Advantageous Effects of Invention

According to the present invention, it is possible to determine recommended order quantity so that the total required quantity of commodities does not vary significantly from total recommended quantity.

BRIEF DESCRIPTION OF DRAWINGS

FIG. 1 is a block diagram depicting an exemplary embodiment of a recommended order quantity determining device according to the present invention.

FIG. 2 is an explanatory diagram depicting an example of a process of calculating a fraction.

FIG. 3 is an explanatory diagram depicting an example of performing rounding.

FIG. 4 is an explanatory diagram depicting an example of a process of correcting recommended order quantity.

FIG. 5 is an explanatory diagram depicting an example of a result of rounding by exceeded number.

FIG. 6 is an explanatory diagram depicting an example of a result of rounding by included number.

FIG. 9 is an explanatory diagram depicting an example of a result of performing rounding.

FIG. 11 is an explanatory diagram depicting an example of a process of determining recommended order quantity.

DESCRIPTION OF EMBODIMENT

Figure 7:
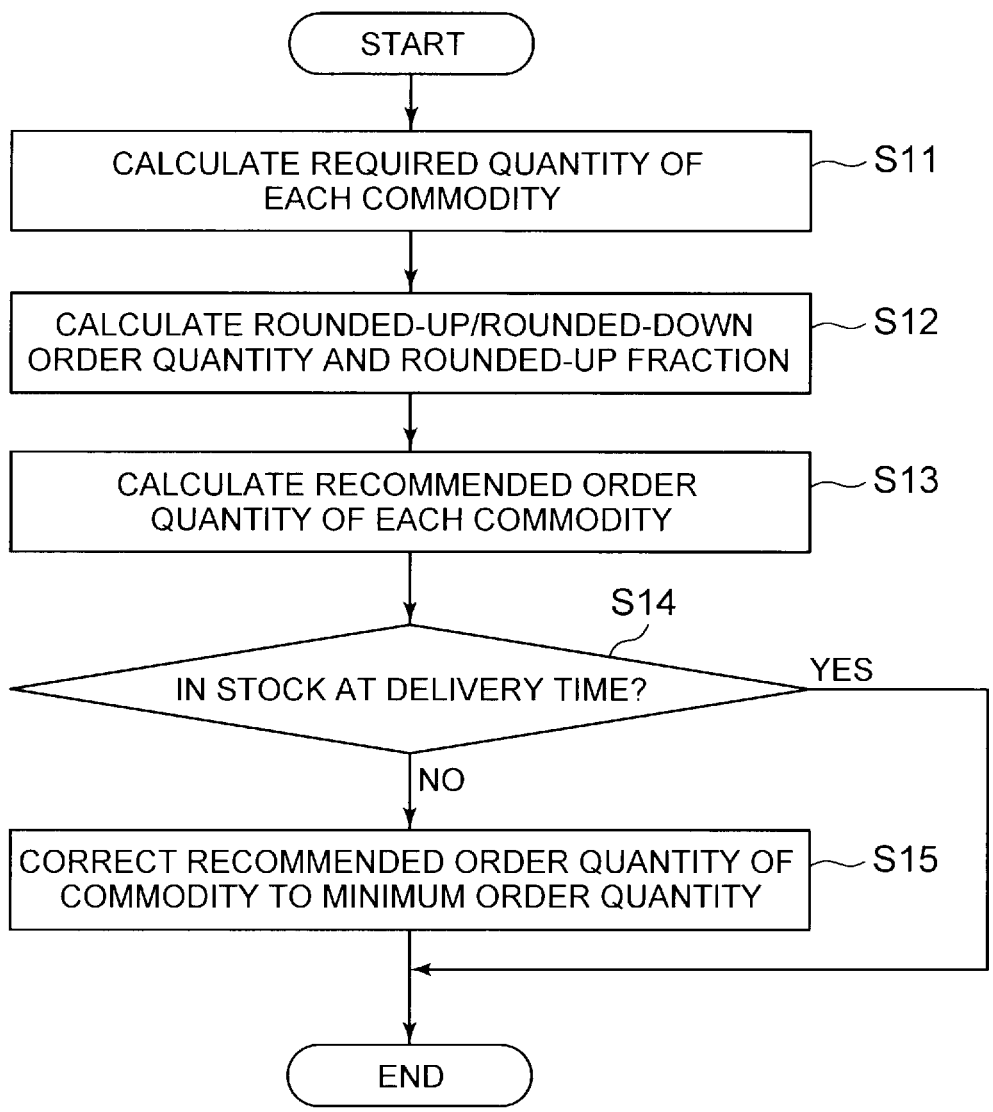
FIG. 7 is a flowchart depicting an example of a process of determining recommended order quantity.

An exemplary embodiment of the present invention will be described below, with reference to the drawings.

FIG. 1 is a block diagram depicting an exemplary embodiment of a recommended order quantity determining device according to the present invention. A recommended order quantity determining device 100 according to this exemplary embodiment includes a storage unit 10, a required quantity calculation unit 20, a fraction calculation unit 30, and a recommended order quantity determination unit 40.

The storage unit 10 stores the order unit of each commodity. Herein, the "order unit" includes the minimum order quantity of the commodity and the unit in which the commodity is orderable (hereafter referred to as "orderable unit"). The minimum order quantity may be, for example, 1, or 2 or more. The storage unit 10 may also store the required quantity of each commodity and the total required quantity of the corresponding commodity category calculated by the below-described required quantity calculation unit 20. For example, the storage unit 10 is implemented by a magnetic disk or the like.

The required quantity calculation unit 20 calculates the required quantity of each commodity and the total required quantity of the commodity category including the commodity. In this exemplary embodiment, the required quantity calculation unit 20 calculates the required quantity of each commodity to the decimal unit. The total required quantity of the commodity category is the sum total of the commodity quantities required in the whole commodity category, that is, the sum total of the required quantities of the commodities calculated in decimal unit. Hence, in this exemplary embodiment, the required quantity of each commodity can be regarded as the quantity of each commodity obtained as a result of the total required quantity of the commodity category being subjected to proportional distribution in consideration of the decimal unit. Alternatively, the required quantity of each commodity may be expressed by an integer as a result of calculation.

Any method may be used to calculate the required quantity of each commodity and the total required quantity of the commodity category. For example, the required quantity calculation unit 20 may calculate the demand prediction quantity of each commodity as the required quantity, using a prediction model for predicting demand quantity. As the prediction model, for example, a prediction model that predicts the demand quantity in commodity category unit (category demand prediction quantity) on a daily basis is used. In this case, the required quantity calculation unit 20 first summarizes the most recent sales results in category unit, and calculates an hourly sales composition ratio. The required quantity calculation unit 20 then multiplies the daily prediction result by the calculated sales composition ratio as an hourly proportional distribution ratio, to calculate the category demand prediction quantity on an hourly basis.

In this case, the required quantity calculation unit 20 may calculate the demand prediction quantity of each single commodity from the category demand prediction quantity calculated on an hourly basis, as required quantity. For example, the required quantity calculation unit 20 may calculate the demand prediction quantity (i.e. required quantity) of each single commodity by proportionally distributing the category demand prediction quantity from the past results (sales composition ratio) of each commodity. To increase the accuracy of the demand prediction quantity for each single commodity, the required quantity calculation unit 20 may subject only each commodity in stock at the order time to proportional distribution.

To absorb fluctuations in demand prediction, the required quantity calculation unit 20 may calculate safety stock quantity and add it to the required quantity. Any method may be used to calculate the safety stock quantity. For example, the required quantity calculation unit 20 may calculate the safety stock quantity of each commodity using an error of the calculated daily demand quantity. In the case of taking increased stock quantity into account, the required quantity calculation unit 20 may calculate the required quantity by adding the increased stock quantity to the demand prediction quantity.

The fraction calculation unit 30 calculates, for each commodity, a fraction which is a difference from the required quantity in the case where the commodity is ordered in prescribed order unit. Specifically, the fraction calculation unit 30 calculates, for each commodity, a fraction that occurs when rounding up the required quantity to the order unit (hereafter referred to as "rounded-up fraction") and a fraction that occurs when rounding down the required quantity to the order unit (hereafter referred to as "rounded-down fraction").

The fraction calculation unit 30 calculates rounded-down order quantity and rounded-up order quantity from the required quantity of each commodity, depending on the order unit of the commodity. Herein, the rounded-down order quantity represents order quantity when rounding down the required quantity to the order unit. That is, the value obtained by subtracting the rounded-down order quantity from the required quantity is the rounded-down fraction. The rounded-up order quantity represents order quantity when rounding up the required quantity to the order unit. That is, the value obtained by subtracting the required quantity from the rounded-up order quantity is the rounded-up fraction.

FIG. 2 is an explanatory diagram depicting an example of a process of calculating a fraction. For example, suppose, as order unit, the minimum order quantity is 2 pieces and the orderable unit is 2 pieces, and the required quantity is 6.3 pieces. In this case, the rounded-up order quantity is 8 pieces, and the rounded-up fraction is 8−6.3=1.7 pieces. Moreover, the rounded-down order quantity is 6 pieces, and the rounded-down fraction is 6.3−6=0.3 pieces.

In the case where the rounded-up order quantity is less than the minimum order quantity, the fraction calculation unit 30 may determine the rounded-up order quantity to be the minimum order quantity.

FIG. 3 is an explanatory diagram depicting an example of performing rounding. In the example depicted in FIG. 3, six commodities (commodity A to commodity F) are included in a commodity category. For example, for commodity A, the orderable unit is 2 pieces and the required quantity is 16.6 pieces, so that the rounded-up order quantity is determined as 18 pieces and the rounded-down order quantity is determined as 16 pieces in consideration of order unit of 2 pieces. The rounded-up fraction is calculated at 18−16.6=1.4 pieces. For example, for commodity F, the orderable unit is 1 piece and the required quantity is 1.3 pieces, whereas the minimum order quantity is 3 pieces, so that the rounded-up order quantity is determined as 3 pieces and the rounded-down order quantity is determined as 0 pieces. The rounded-up fraction is calculated at 3−1.3=1.7 pieces.

The recommended order quantity determination unit 40 determines the recommended order quantity of each commodity. Specifically, the recommended order quantity determination unit 40 determines the recommended order quantity of each commodity from the required quantity of the commodity expressed by a decimal, depending on the order unit of the commodity. The recommended order quantity assumed in this exemplary embodiment is an integer. The recommended order quantity determination unit 40 selects, for each commodity, rounding down or rounding up of a fraction calculated depending on the order unit of the commodity, to determine the recommended order quantity. That is, the recommended order quantity determination unit 40 determines one of the rounded-down order quantity and the rounded-up order quantity as the recommended order quantity for each commodity.

In particular, the recommended order quantity determination unit 40 determines the recommended order quantity (i.e. selects one of the rounded-down order quantity and the rounded-up order quantity) depending on the total required quantity of the commodity category including the commodity so that the total required quantity of the commodity category does not vary significantly from the total recommended quantity. Herein, the total recommended quantity is the sum total of the recommended order quantities.

For example, in the case where the rounded-up order quantity is set as the recommended order quantity, the recommended order quantity determination unit 40 may determine the recommended order quantity by adding the rounded-up fraction to the required quantity of the commodity.

A method of determining the recommended order quantity of each commodity in the same commodity category will be described below, using the specific example depicted in FIG. 3.

First, the recommended order quantity determination unit 40 determines the recommended order quantity to be the rounded-up order quantity, for commodities in ascending order of the rounded-up fraction. In the example depicted in FIG. 3, commodity B, commodity E, commodity C, commodity D, commodity A, and commodity F are in ascending order of the rounded-up fraction. Accordingly, the recommended order quantity determination unit 40 performs a process (rounding up) of setting the recommended order quantity to the rounded-up order quantity in this order.

The recommended order quantity determination unit 40 repeatedly performs rounding up until the sum total of the recommended order quantities of the commodities for each of which the recommended order quantity is determined to be the rounded-up order quantity and the sum total of the rounded-down order quantities of the commodities for each of which the recommended order quantity is not yet determined exceed the total required quantity of the commodity category to which these commodities belong. In the case where the required quantity of the commodity category is exceeded, the recommended order quantity determination unit 40 determines to set the recommended order quantity of each of the remaining commodities (i.e. the commodities for each of which the recommended order quantity is not yet determined) to the rounded-down order quantity. The recommended order quantity determination unit 40 may determine the recommended order quantity of the commodity subjected to rounding up with which the required quantity of the commodity category is exceeded, to be the rounded-up order quantity or to be the rounded-down order quantity. Which order quantity is adopted may be set beforehand using a parameter and the like.

Thus, the recommended order quantity determination unit 40 determines whether the recommended order quantity of each commodity is to be the rounded-up order quantity or the rounded-down order quantity, in consideration of the total required quantity of the commodity category. The recommended order quantity can therefore be determined so that the total required quantity of the commodities does not vary significantly from the total recommended quantity.

Consider a commodity with small required quantity. While commodities to be assorted are likely to be intended to be displayed, a commodity with small required quantity has a large rounded-up fraction. This incurs the possibility that rounding up is not performed and as a result no order is made for the commodity. In view of this, the recommended order quantity determination unit 40 may correct the recommended order quantity of each commodity whose rounded-down order quantity is 0, to the predetermined minimum order quantity.

FIG. 4 is an explanatory diagram depicting an example of a process of correcting recommended order quantity. For example, suppose, as the order unit, the minimum order quantity is 2 pieces and the orderable unit is 2 pieces, and the required quantity is 1.1 pieces. In this case, even when the fraction (=required quantity) is rounded down and the recommended order quantity is 0 as a result of rounding, the recommended order quantity is set to the minimum order quantity of 2 pieces.

Two types of timings are assumed as the timing of correction to the minimum order quantity. The recommended order quantity determination unit 40 may perform the correction of the recommended order quantity of each commodity whose rounded-down order quantity is 0, after calculating the recommended order quantity of each commodity whose rounded-down order quantity is not 0. In the case where the correction is performed at this timing, the correction is performed after the required quantity of the commodity category is exceeded. The recommended order quantity as a result of such correction can therefore be referred to as "exceeded number". As a result of performing the correction by exceeded number, necessary commodities can be subjected to rounding up while reducing the risk of chance loss.

FIG. 5 is an explanatory diagram depicting an example of a result of rounding by exceeded number. In the example depicted in FIG. 5, the recommended order quantity determination unit 40 performs rounding up for commodity B, commodity E, commodity C, and commodity D in ascending order of the rounded-up fraction. At this point, the total recommended quantity of the category exceeds the total required quantity. Accordingly, the recommended order quantity determination unit 40 determines the recommended order quantity of each of the remaining commodity A and commodity F to be the rounded-down order quantity. If the recommended order quantity of commodity F is set to the rounded-down order quantity, however, the recommended order quantity will end up being 0. The recommended order quantity determination unit 40 therefore corrects the recommended order quantity of commodity F to the minimum order quantity. This can reduce the risk of chance loss for commodity F.

The recommended order quantity determination unit 40 may perform the correction of the recommended order quantity of each commodity whose rounded-down order quantity is 0, before calculating the recommended order quantity of each commodity whose rounded-down order quantity is not 0. In the case where the correction is performed at this timing, the recommended order quantity after the correction is included in the required quantity of the commodity category. The recommended order quantity as a result of such correction can therefore be referred to as "included number". As a result of performing the correction by included number, the recommended order quantity close to the required quantity is calculated, so that necessary commodities can be subjected to rounding up while reducing the risk of waste loss.

FIG. 6 is an explanatory diagram depicting an example of a result of rounding by included number. In the example depicted in FIG. 6, the recommended order quantity determination unit 40 first performs rounding up for each of commodity E and commodity F whose rounded-down order quantity is 0, to correct the recommended order quantity to the minimum order quantity. The recommended order quantity determination unit 40 then performs rounding up for commodity B with the smallest rounded-up fraction. At this point, the total recommended quantity of the category exceeds the total required quantity. Accordingly, the recommended order quantity determination unit 40 determines the recommended order quantity of each of the remaining commodity A, commodity D, and commodity F to be the rounded-down order quantity. This can reduce the risk of waste loss in the whole commodity category.

If the recommended order quantity of a commodity with small required quantity is corrected every time, an overstock may occur. In view of this, the recommended order quantity determination unit 40 may correct the recommended order quantity to the minimum order quantity in the case where the stock quantity at the order time or the logical stock quantity at the delivery time is 0. Whether the order time or the delivery time is adopted may be set beforehand using a parameter and the like.

FIG. 7 is a flowchart depicting an example of a process of determining recommended order quantity in consideration of stock quantity. The process depicted in FIG. 7 is rounding in terms of the foregoing exceeded number.

First, the required quantity calculation unit 20 calculates the required quantity of each commodity (step S11). The fraction calculation unit 30 then calculates the rounded-up/rounded-down order quantity and the rounded-up fraction (step S12). The recommended order quantity determination unit 40 then calculates the recommended order quantity of each commodity (step S13). Specifically, the recommended order quantity determination unit 40 performs rounding up for commodities in ascending order of the rounded-up fraction until the total required quantity of the commodity category is reached.

Next, the recommended order quantity determination unit 40 determines whether a commodity whose recommended order quantity is 0 is in stock at the order time or the delivery time (step S14). In the case where the commodity is out of stock at the time (step S14: No), the recommended order quantity determination unit 40 corrects the recommended order quantity of the commodity to the minimum order quantity (step S15). In the case where the commodity is in stock at the time (step S14: Yes), the recommended order quantity determination unit 40 ends the process without correcting the recommended order quantity of the commodity.

Figure 8:
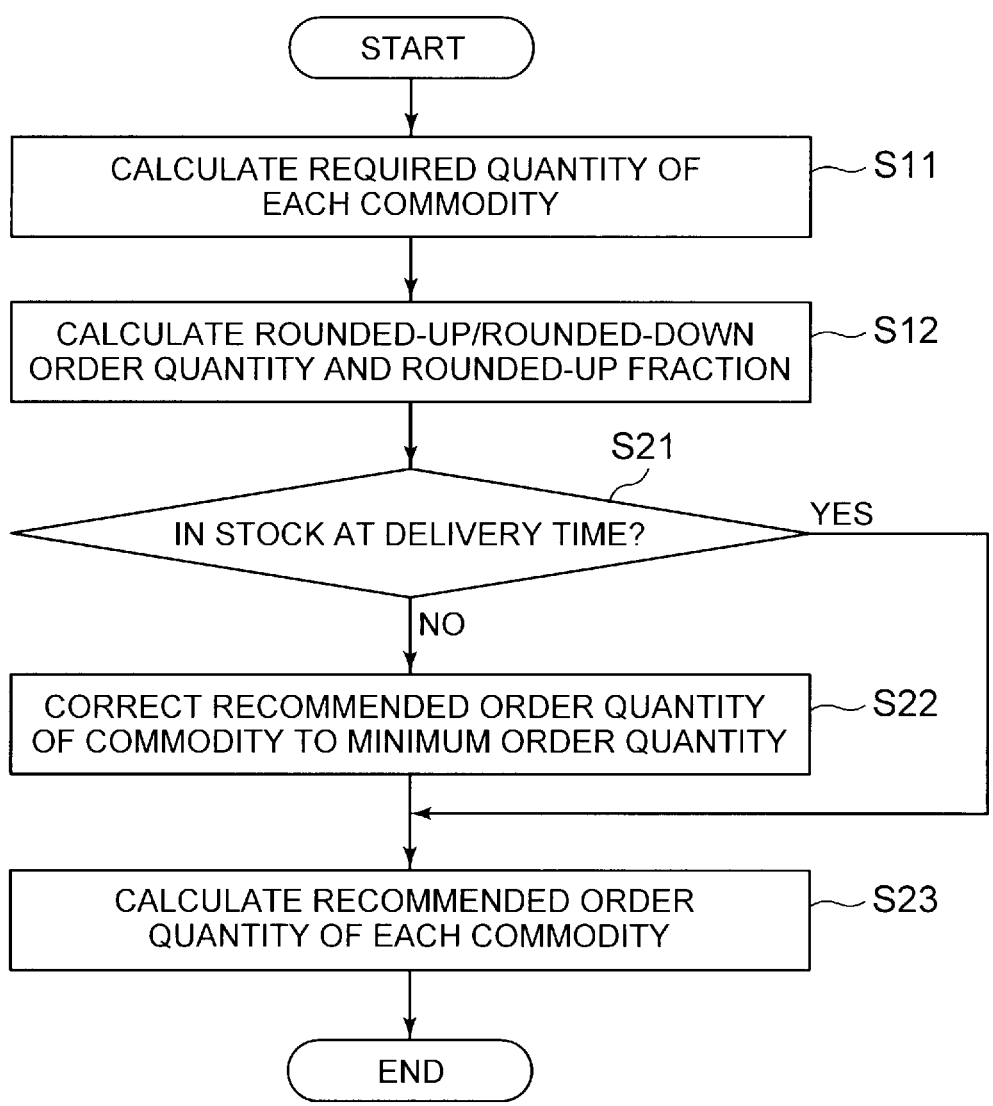
FIG. 8 is a flowchart depicting another example of a process of determining recommended order quantity.

FIG. 8 is a flowchart depicting another example of a process of determining recommended order quantity in consideration of stock quantity. The process depicted in FIG. 8 is rounding in terms of the foregoing included number. As in the case of exceeded number, the required quantity calculation unit 20 first calculates the required quantity of each commodity (step S11). The fraction calculation unit 30 then calculates the rounded-up/rounded-down order quantity and the rounded-up fraction (step S12).

Next, the recommended order quantity determination unit 40 determines whether a commodity whose rounded-down order quantity is 0 is in stock at the order time or the delivery time (step S21). In the case where the commodity is out of stock at the time (step S21: No), the recommended order quantity determination unit 40 corrects the recommended order quantity of the commodity to the minimum order quantity (step S22). In the case where the commodity is in stock at the time (step S21: Yes), the recommended order quantity determination unit 40 advances to step S23 without correcting the recommended order quantity of the commodity.

The recommended order quantity determination unit 40 then calculates the recommended order quantity of each commodity (step S23). Specifically, the recommended order quantity determination unit 40 performs rounding up for commodities in ascending order of the rounded-up fraction until the total required quantity of the commodity category is reached.

As described above, in this exemplary embodiment, the recommended order quantity determination unit 40 determines the recommended order quantity of each commodity from the required quantity of the commodity expressed by a decimal, depending on the order unit of the commodity and the total required quantity of the commodity category including the commodity. The recommended order quantity can therefore be determined so that the total required quantity of the commodities does not vary significantly from the total recommended quantity.

Rounding is performed for each commodity of the same commodity category delivered at the same time. Commodities that differ in delivery time may be subjected to rounding separately. The effect on the next delivery as a result of performing rounding will be described below. FIG. 9 is an explanatory diagram depicting an example of a result of performing rounding.

For example, suppose the recommended order quantity is calculated at 10 pieces as a result of performing rounding for a commodity whose required quantity is 9.7 pieces. In this case, 0.3 pieces are added to the recommended order quantity by rounding up. That is, the stock quantity at the delivery time is increased by 0.3 pieces. As a result of this process, in the case of calculating the required quantity for the next delivery, the recommended order quantity is reduced by 0.3 pieces (i.e. the fraction processed at the last delivery is taken into consideration at the next delivery), and thus the subsequent recommended order quantity can be calculated properly.

The required quantity calculation unit 20, the fraction calculation unit 30, and the recommended order quantity determination unit 40 are implemented by a processor (e.g. CPU (central processing unit), GPU (graphics processing unit), FPGA (field-programmable gate array)) of a computer operating according to a program (recommended order quantity determination program).

For example, the program may be stored in the storage unit 10, with the processor reading the program and, according to the program, operating as the required quantity calculation unit 20, the fraction calculation unit 30, and recommended order quantity determination unit 40. The functions of the recommended order quantity determining device may be provided in the form of SaaS (Software as a Service).

The required quantity calculation unit 20, the fraction calculation unit 30, and the recommended order quantity determination unit 40 may each be implemented by dedicated hardware. All or part of the components of each device may be implemented by general-purpose or dedicated circuitry, processors, or combinations thereof. They may be configured with a single chip, or configured with a plurality of chips connected via a bus. All or part of the components of each device may be implemented by a combination of the above-mentioned circuitry or the like and program.

In the case where all or part of the components of the recommended order quantity determining device is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-server system or a cloud computing system.

Figure 10:
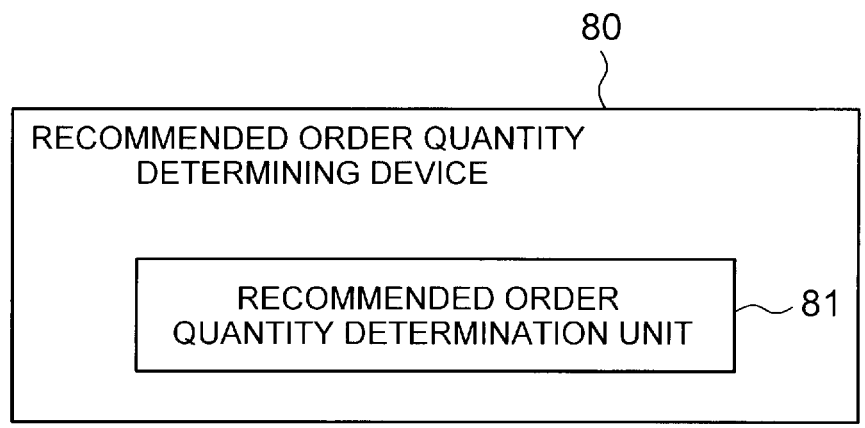
FIG. 10 is a block diagram depicting an overview of a recommended order quantity determining device according to the present invention.

An overview of the present invention will be given below. FIG. 10 is a block diagram depicting an overview of a recommended order quantity determining device according to the present invention. A recommended order quantity determining device 80 according to the present invention includes a recommended order quantity determination unit 81 (e.g. the recommended order quantity determination unit 40) which determines a recommended order quantity of each commodity from a required quantity of the commodity expressed by a decimal, depending on an order unit of the commodity (e.g. minimum order quantity, orderable unit).

With such a structure, the recommended order quantity can be determined so that the total required quantity of the commodities does not vary significantly from the total recommended quantity.

The recommended order quantity determination unit 81 may select, for each commodity, rounding down or rounding up of a fraction calculated depending on the order unit of the commodity, to determine the recommended order quantity.

The recommended order quantity determination unit 81 may determine the recommended order quantity of each commodity, depending on a total required quantity of a commodity category including the commodity.

The recommended order quantity determining device 80 may include a fraction calculation unit (e.g. the fraction calculation unit 30) for calculating, for each commodity, a fraction depending on the order unit of the commodity, from the required quantity of the commodity. The recommended order quantity determination unit 81 may determine the recommended order quantity by adding the fraction to or subtracting the fraction from the required quantity of the commodity.

Specifically, the fraction calculation unit may calculate a rounded-down order quantity and a rounded-up order quantity from the required quantity of the commodity expressed by a decimal, depending on the order unit of the commodity, and the recommended order quantity determination unit 81 may determine one of the rounded-down order quantity and the rounded-up order quantity as the recommended order quantity, depending on the total required quantity of the commodity category including the commodity.

The recommended order quantity determination unit 81 may correct a recommended order quantity of a commodity whose rounded-down order quantity is 0, to a predetermined minimum order quantity.

The recommended order quantity determination unit 81 may correct the recommended order quantity to the minimum order quantity, in the case where a stock quantity at an order time or a logical stock quantity at a delivery time is 0.

The recommended order quantity determination unit 81 may correct the recommended order quantity of the commodity whose rounded-down order quantity is 0, before calculating a recommended order quantity of a commodity whose rounded-down order quantity is not 0.

The foregoing exemplary embodiment can be wholly or partly described as, but is not limited to, the following supplementary notes.

(Supplementary note 1) A recommended order quantity determining device including a recommended order quantity determination unit which determines a recommended order quantity of each commodity from a required quantity of the commodity expressed by a decimal, depending on an order unit of the commodity, wherein the recommended order quantity determination unit determines the recommended order quantity of each commodity, depending on a total required quantity of a commodity category including the commodity.

(Supplementary note 2) The recommended order quantity determining device according to supplementary note 1, wherein the recommended order quantity determination unit selects, for each commodity, rounding down or rounding up of a fraction calculated depending on the order unit of the commodity, to determine the recommended order quantity.

(Supplementary note 3) The recommended order quantity determining device according to supplementary note 2, wherein the recommended order quantity determination unit determines, for each of commodities in ascending order of a fraction to be rounded up, a recommended order quantity of the commodity to be an order quantity obtained by rounding up the fraction.

(Supplementary note 4) The recommended order quantity determining device according to any one of supplementary notes 1 to 3, including a fraction calculation unit which calculates a rounded-down order quantity and a rounded-up order quantity from the required quantity of the commodity expressed by a decimal, depending on the order unit of the commodity, wherein the recommended order quantity determination unit determines one of the rounded-down order quantity and the rounded-up order quantity as the recommended order quantity, depending on the total required quantity of the commodity category including the commodity.

(Supplementary note 5) The recommended order quantity determining device according to supplementary note 4, wherein the recommended order quantity determination unit corrects a recommended order quantity of a commodity whose rounded-down order quantity is 0, to a predetermined minimum order quantity.

(Supplementary note 6) The recommended order quantity determining device according to supplementary note 5, wherein the recommended order quantity determination unit corrects the recommended order quantity to the minimum order quantity, in the case where a stock quantity at an order time or a logical stock quantity at a delivery time is 0.

(Supplementary note 7) The recommended order quantity determining device according to supplementary note 5 or 6, wherein the recommended order quantity determination unit corrects the recommended order quantity of the commodity whose rounded-down order quantity is 0, before calculating a recommended order quantity of a commodity whose rounded-down order quantity is not 0.

(Supplementary note 8) The recommended order quantity determining device according to supplementary note 5 or 6, wherein the recommended order quantity determination unit corrects the recommended order quantity of the commodity whose rounded-down order quantity is 0, after calculating a recommended order quantity of a commodity whose rounded-down order quantity is not 0.

(Supplementary note 9) The recommended order quantity determining device according to any one of supplementary notes 4 to 8, wherein the recommended order quantity determination unit determines, for each of commodities in ascending order of a rounded-up fraction, the recommended order quantity to be the rounded-up order quantity.

(Supplementary note 10) The recommended order quantity determining device according to supplementary note 9, wherein, when a sum total of recommended order quantities of commodities for each of which the recommended order quantity is determined to be the rounded-up order quantity and a sum total of rounded-down order quantities of commodities for each of which the recommended order quantity is not yet determined exceed the total required quantity of the commodity category to which the commodities belong, the recommended order quantity determination unit determines the recommended order quantity of each commodity for which the recommended order quantity is not yet determined, to be the rounded-down order quantity.

(Supplementary note 11) The recommended order quantity determining device according to any one of supplementary notes 4 to 10, wherein the fraction calculation unit calculates, for each commodity, a fraction depending on the order unit of the commodity, from the required quantity of the commodity, and wherein the recommended order quantity determination unit determines the recommended order quantity by adding the fraction to or subtracting the fraction from the required quantity of the commodity.

(Supplementary note 12) A recommended order quantity determination method including determining a recommended order quantity of each commodity from a required quantity of the commodity expressed by a decimal, depending on an order unit of the commodity and a total required quantity of a commodity category including the commodity.

(Supplementary note 13) The recommended order quantity determination method according to supplementary note 12, wherein, for each commodity, rounding down or rounding up of a fraction calculated depending on the order unit of the commodity is selected to determine the recommended order quantity.

(Supplementary note 14) A recommended order quantity determination program for causing a computer to perform a recommended order quantity determination process of determining a recommended order quantity of each commodity from a required quantity of the commodity expressed by a decimal, depending on an order unit of the commodity, wherein in the recommended order quantity determination process, the computer is caused to determine the recommended order quantity of each commodity, depending on a total required quantity of a commodity category including the commodity.

(Supplementary note 15) The recommended order quantity determination program according to supplementary note 14, wherein in the recommended order quantity determination process, the computer is caused to select, for each commodity, rounding down or rounding up of a fraction calculated depending on the order unit of the commodity, to determine the recommended order quantity.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST 10 storage unit
20 required quantity calculation unit
30 fraction calculation unit
40 recommended order quantity determination unit
100 recommended order quantity determining device

The invention claimed is:

1. A recommended order quantity determining device comprising a hardware processor configured to execute a software code to:
calculate, to at least one decimal unit, a required quantity of each commodity of a plurality of commodities;
determine a recommended order quantity of each commodity from the required quantity of each commodity expressed to the at least one decimal unit, depending on an order unit of the commodity; and
determine the recommended order quantity of each commodity, depending on a total required quantity of a commodity category including the commodity.

2. The recommended order quantity determining device according to claim 1, wherein the hardware processor is configured to execute a software code to select, for each commodity, rounding down or rounding up of a fraction calculated depending on the order unit of the commodity, to determine the recommended order quantity.

3. The recommended order quantity determining device according to claim 2, wherein the hardware processor is configured to execute a software code to determine, for each of commodities in ascending order of a fraction to be rounded up, a recommended order quantity of the commodity to be an order quantity obtained by rounding up the fraction.

4. The recommended order quantity determining device according to claim 1, wherein the hardware processor is configured to execute a software code to:
calculate a rounded-down order quantity and a rounded-up order quantity from the required quantity of the commodity expressed by a decimal, depending on the order unit of the commodity, and
determine one of the rounded-down order quantity and the rounded-up order quantity as the recommended order quantity, depending on the total required quantity of the commodity category including the commodity.

5. The recommended order quantity determining device according to claim 4, wherein the hardware processor is configured to execute a software code to correct a recommended order quantity of a commodity whose rounded-down order quantity is 0, to a predetermined minimum order quantity.

6. The recommended order quantity determining device according to claim 5, wherein the hardware processor is configured to execute a software code to correct the recommended order quantity to the minimum order quantity, in the case where a stock quantity at an order time or a logical stock quantity at a delivery time is 0.

7. The recommended order quantity determining device according to claim 5, wherein the hardware processor is configured to execute a software code to correct the recommended order quantity of the commodity whose rounded-down order quantity is 0, before calculating a recommended order quantity of a commodity whose rounded-down order quantity is not 0.

8. The recommended order quantity determining device according to claim 5, wherein the hardware processor is configured to execute a software code to correct the recommended order quantity of the commodity whose rounded-down order quantity is 0, after calculating a recommended order quantity of a commodity whose rounded-down order quantity is not 0.

9. The recommended order quantity determining device according to claim 4, wherein the hardware processor is configured to execute a software code to determine, for each of commodities in ascending order of a rounded-up fraction, the recommended order quantity to be the rounded-up order quantity.

10. The recommended order quantity determining device according to claim 9, wherein, when a sum total of recommended order quantities of commodities for each of which the recommended order quantity is determined to be the rounded-up order quantity and a sum total of rounded-down order quantities of commodities for each of which the recommended order quantity is not yet determined exceed the total required quantity of the commodity category to which the commodities belong, the hardware processor is configured to execute a software code to determine the recommended order quantity of each commodity for which the recommended order quantity is not yet determined, to be the rounded-down order quantity.

11. The recommended order quantity determining device according to claim 4, wherein the hardware processor is configured to execute a software code to:
calculate, for each commodity, a fraction depending on the order unit of the commodity, from the required quantity of the commodity, and
determine the recommended order quantity by adding the fraction to or subtracting the fraction from the required quantity of the commodity.

12. A recommended order quantity determination method comprising:
calculating, to at least one decimal unit, a required quantity of each commodity of a plurality of commodities; and
determining a recommended order quantity of each commodity from the required quantity of each commodity expressed to the at least one decimal unit, depending on an order unit of the commodity and a total required quantity of a commodity category including the commodity.

13. The recommended order quantity determination method according to claim 12, wherein, for each commodity, rounding down or rounding up of a fraction calculated depending on the order unit of the commodity is selected to determine the recommended order quantity.

14. A non-transitory computer readable information recording medium storing a recommended order quantity determination program, when executed by a processor, that performs a method for:
calculating, to at least one decimal unit, a required quantity of each commodity of a plurality of commodities; and
determining a recommended order quantity of each commodity from the required quantity of each commodity expressed to the at least one decimal unit, depending on an order unit of the commodity and a total required quantity of a commodity category including the commodity.

15. The non-transitory computer readable information recording medium according to claim 14, wherein, for each commodity, rounding down or rounding up of a fraction calculated depending on the order unit of the commodity is selected to determine the recommended order quantity.

16. The recommended order quantity determining device according to claim 1, wherein the hardware processor is configured to execute a software code to calculate the required quantity of each commodity which is the quantity of each commodity obtained as a result of the total required quantity of the commodity category being subjected to proportional distribution in consideration of the at least one decimal unit.

* * * * *